(12) United States Patent
Riordan et al.

(10) Patent No.: US 9,100,343 B1
(45) Date of Patent: Aug. 4, 2015

(54) STORAGE DESCRIPTORS AND SERVICE CATALOGS IN A CLOUD ENVIRONMENT

(75) Inventors: Brian Riordan, West Newton, MA (US); David Barta, West Roxbury, MA (US); John R. Sopka, Groton, MA (US); David Meiri, Cambridge, MA (US); Alexandr Veprinsky, Brookline, MA (US)

(73) Assignee: EMC CORPORATION, Hopkinton, MA (US)

( * ) Notice: Subject to any disclaimer, the term of this patent is extended or adjusted under 35 U.S.C. 154(b) by 473 days.

(21) Appl. No.: 13/434,264

(22) Filed: Mar. 29, 2012

(51) Int. Cl.
*G06F 15/173* (2006.01)
*H04L 12/24* (2006.01)

(52) U.S. Cl.
CPC .................... *H04L 41/5048* (2013.01)

(58) Field of Classification Search
None
See application file for complete search history.

(56) References Cited

U.S. PATENT DOCUMENTS

| | | | | |
|---|---|---|---|---|
| 6,430,611 | B1 * | 8/2002 | Kita et al. | 709/223 |
| 8,032,634 | B1 * | 10/2011 | Eppstein et al. | 709/226 |
| 8,386,418 | B2 * | 2/2013 | Birch et al. | 707/602 |
| 2011/0283290 | A1 * | 11/2011 | Thunquest et al. | 718/104 |

* cited by examiner

*Primary Examiner* — John B Walsh
(74) *Attorney, Agent, or Firm* — Anderson Gorecki & Rouille LLP (57) ABSTRACT

A storage node uses storage descriptors for provisioning, monitoring and reporting. The storage descriptors indicate available storage resource capabilities and storage resource requirements for particular applications or types of applications using a common set of metrics. The storage node scales requirements to approximate a particular deployment scenario and then compares available capabilities and requirements as indicated by the storage descriptors.

30 Claims, 7 Drawing Sheets

STORAGE DESCRIPTORS AND SERVICE CATALOGS IN A CLOUD ENVIRONMENT

CROSS-REFERENCE TO RELATED APPLICATIONS

NA

BACKGROUND OF THE INVENTION

The invention is generally related to electronic data storage systems which are accessed via a network, and more particularly to provisioning applications with storage resources. Different applications have different storage resource requirements based on a variety of factors. In addition, each application may have multiple storage resource service level agreements. Certain storage resources are required to support basic operation of an application and to meet its expected service level, and other storage resources may affect application performance. Storage administrators configure storage arrays to meet predefined customer availability and performance requirements. Generally, availability can include ability to survive failures, time to recover from failures, and mean time to failure, and performance may include bandwidth, response time, and I/O rate. Storage array configuration is typically performed independently of server and application configuration because multiple disparate applications are typically supported by a single storage array and configured or re-configured independently. As a result, there is a risk of interference, performance degradation and compliance problems among storage resources assigned to separate applications. In order to avoid such problems it is common to involve both a storage administrator and an application administrator to deploy a new application or server, or to change a service level. For example, the application administrator may determine that an application requires a 1 ms response time, and the storage administrator would then allocate the appropriate drive technology needed to satisfy that requirement. Networking and server changes may in turn be needed to present the storage to the application. Coordinating the three activities is error prone. Consequently, deployment can be prone to error, slow and costly. The problem tends to be even more acute in Cloud environments because Clouds involve large pools of resources with resources being allocated dynamically, e.g. for application mobility, through self-service portals. Therefore, the problem must be addressed is a way that is agile and scaleable.

SUMMARY OF THE INVENTION

In accordance with an aspect, a method comprises: receiving information regarding deployment of an application in a network; searching among a plurality of storage descriptors to identify a storage descriptor which is a closest match to the received information, the identified storage descriptor indicating storage resource requirements for the application; comparing the storage resource requirements with available storage resources; and prompting a response based on comparison of the storage resource requirements with available storage resources.

In accordance with another aspect, a computer program stored on non-transitory computer-readable memory comprises: logic which receives, at a storage node, information regarding deployment of an application in a network; logic which searches among a plurality of storage descriptors to identify a storage descriptor which is a closest match to the received information, the identified storage descriptor indicating storage resource requirements for the application; logic which compares the storage resource requirements with available storage resources; and logic which prompts a response based on comparison of the storage resource requirements with available storage resources.

In accordance with another aspect an apparatus comprises: a storage node including storage resources and control logic which: receives information regarding deployment of an application in a network; searches among a plurality of storage descriptors to identify a storage descriptor which is a closest match to the received information, the identified storage descriptor indicating storage resource requirements for the application; compares the storage resource requirements with available storage resources; and prompts a response based on comparison of the storage resource requirements with available storage resources.

Traditional approaches require skilled personnel to match application requirements with storage capabilities. This matching is complex, error-prone, and expensive to maintain correctly. It also requires manual reconfiguration of the storage systems when application requirements change, or when a new application is provisioned, or when an application moves between host servers as in a cloud. Aspects help to overcome these problems because storage node configuration can be automated so that storage administrators might only configure arrays when new hardware is introduced, rather than for every change in the use of data. This reduces the manpower costs of running the data center while increasing the consistency of the results.

Another advantage is the ability to move an application from one storage node to another storage node with a consistent level of performance. This can be accomplished by using an identical or similar descriptor in the target storage array.

Other features and advantages will become apparent in view of the detailed description and figures.

DETAILED DESCRIPTION

Figure 1:
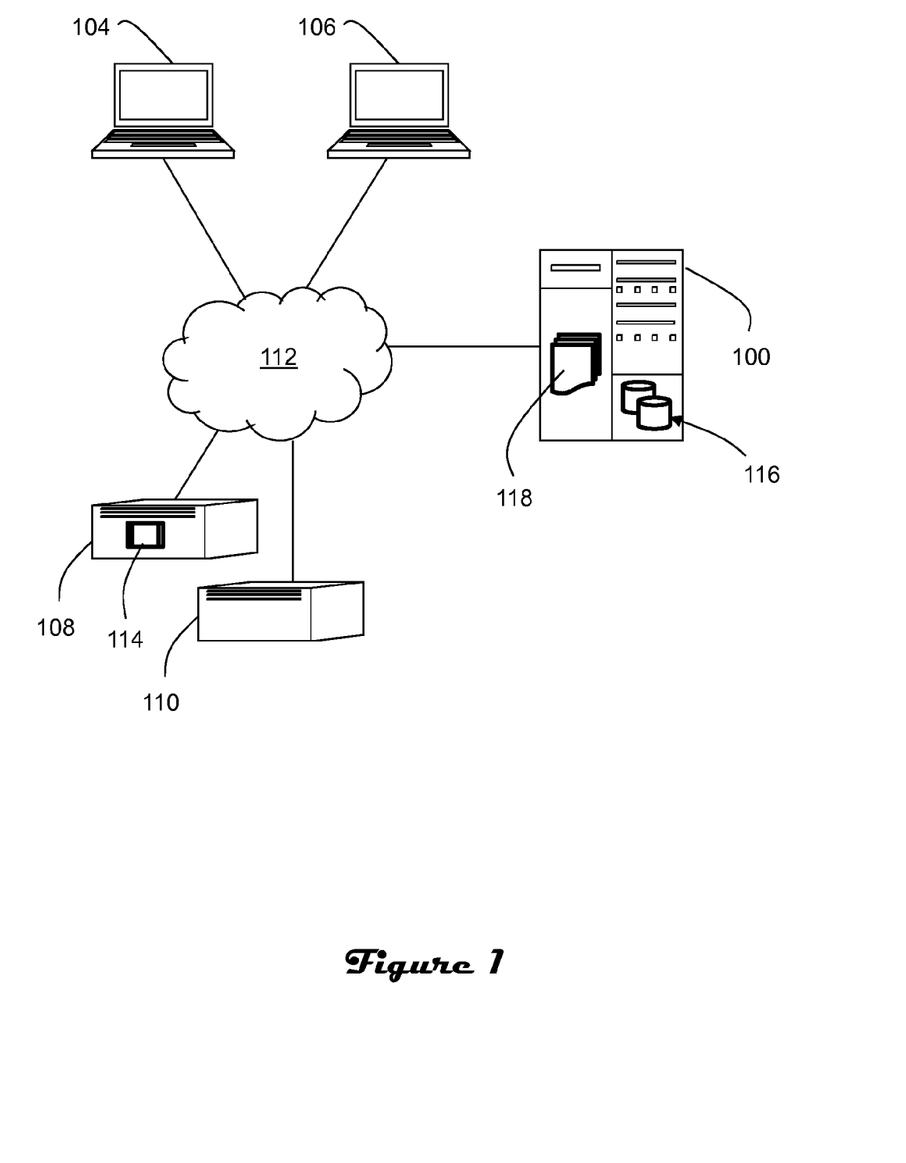
FIG. 1 illustrates a networked "cloud" environment in which storage descriptors and service catalogs are implemented.

FIG. 1 illustrates a network "cloud" environment in which storage descriptors and service catalogs may be utilized. Devices associated with the cloud may include a plurality of network storage nodes such as network storage node 100 which is connected to devices such as user terminals 104, 106 and servers 108, 110 via a network 112. Applications such as app 114 running on the servers, user terminals and other types of devices may utilize the data storage resources 116 of the storage node by issuing data Read and Write operations. Such applications may be deployed as part of a new device deployment or by loading the application onto a device after the device has already been deployed and operated in the network. Moreover, such applications may be moved between devices and distributed among devices.

The requirements of applications and capabilities of storage devices are not generally available in a set of common metrics. For example, a Microsoft Exchange server for 1000 users might require 1000 IO/sec, 5 ms response time, for 70% Read and 30% Write, IO size 32 kb, and with 75% Read-miss ratio. These requirements might be satisfied with, e.g., 20 spindles FC, 10% of data in flash, 4 ports, 20 GB cache, and RAID level 6. However, there has heretofore been no practical automated translation between specific application requirements and suitable storage resources.

In accordance with one aspect, storage descriptors 118 are maintained by one or more devices in order to help determine whether the storage node has suitable storage resources to support an application. The storage descriptors may also be used to help allocate storage resources 116 for the application 114. In general, the requirements of an application are not measured with the same metrics which are used to describe storage resource capabilities. Among other things, storage descriptors can include a representation of capabilities of a data storage system, data storage node, and data storage component. Storage descriptors can also include a representation of application requirements. The attributes represented in the storage descriptors may be expressed using metrics which are used to describe storage resource capabilities, metrics which are used to describe application requirements, or both, provided the storage descriptors enable calculations to be performed to help compare available storage resource capabilities with application requirements. Consequently, procedures for determining whether the storage node has suitable storage resources to support an application, and also potentially provisioning those storage resources, may be partially or fully automated.

Aspects of the invention may be partially or wholly implemented in one or more computer programs. The computer programs are stored on non-transitory computer-readable memory, such as part of the storage resources 116, and implement processes which may be defined by steps when utilized by general processor, specialized processor, or combination of processing devices.

Figure 2:
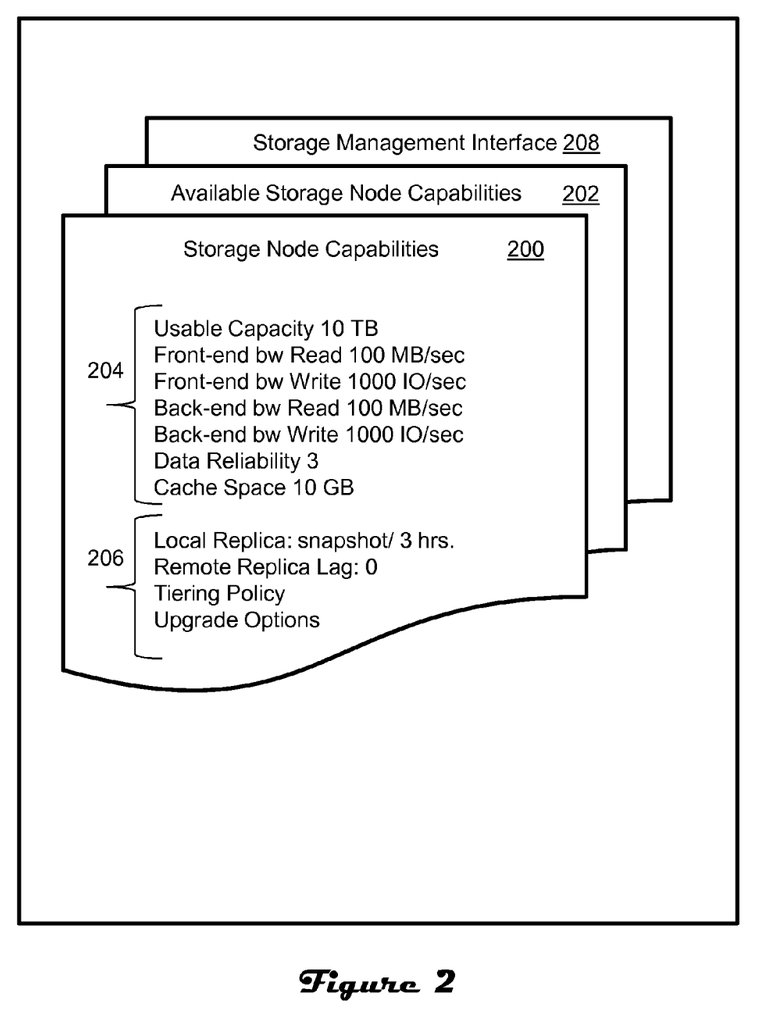
FIGS. 2 and 3 are block diagrams of exemplary storage descriptors.

FIG. 2 illustrates storage descriptors which represent storage resource capabilities of the storage node. The set of storage descriptors may include one or more of a storage node capabilities descriptor 200 and an available storage node capabilities descriptor 202. The representations may include either or both physical layer metrics 204 and logical layer metrics 206. The physical layer metrics may include one or more of: usable capacity (e.g., in bytes); front-end bandwidth for either write or read (e.g., in bytes/sec or IO/sec), which may be particularly useful for cache access where the front-end is the bottleneck for the I/O; back-end bandwidth (e.g., in bytes/sec or IO/sec), which may be useful concerning servicing read-miss or writes; data availability taking into consideration the media reliability and any RAID protection scheme (e.g., in a range of 1 to 6 "nines," where five nines is 99.999% time availability); and cache space (e.g. in bytes). The logical layer includes one or more policies such as: local replicas, such as frequency of snapshots and how long each snapshot is kept; remote replica lag, e.g. the length of time during which updates may be lost in case of a primary site failure; Recovery Point Objective (RPO), which is the point in time to which recovery can be performed, and Recovery Time Objective (RTO), which is the time taken to perform the recovery, may be specified; automated storage tiering policy; and upgrade options such as the ability to create and expand objects in the pool. For example, a storage descriptor may indicate 1 TB of storage with up to 100 MB/sec and 1000 IO/sec on the front end, up to 20 MB/sec and 100 IO/sec of back-end bandwidth, reliability of 99.999% (5 nines), a snapshot every 8 hours with the 3 last snapshots available, and remote synchronous replica (0 lag). The storage descriptor for available storage node capabilities indicates which of the storage node capabilities are available, and if appropriate includes a quantitative metric, e.g., 5 TB available capacity out of 10 TB total capacity. It should be noted that the parameters in the descriptors are objectives, and that failures, workload interference and other problems may prevent those objectives from being achieved. A service provider, monitoring software, or both may monitor operation and make adjustments to compensate for such problems.

Figure 3:
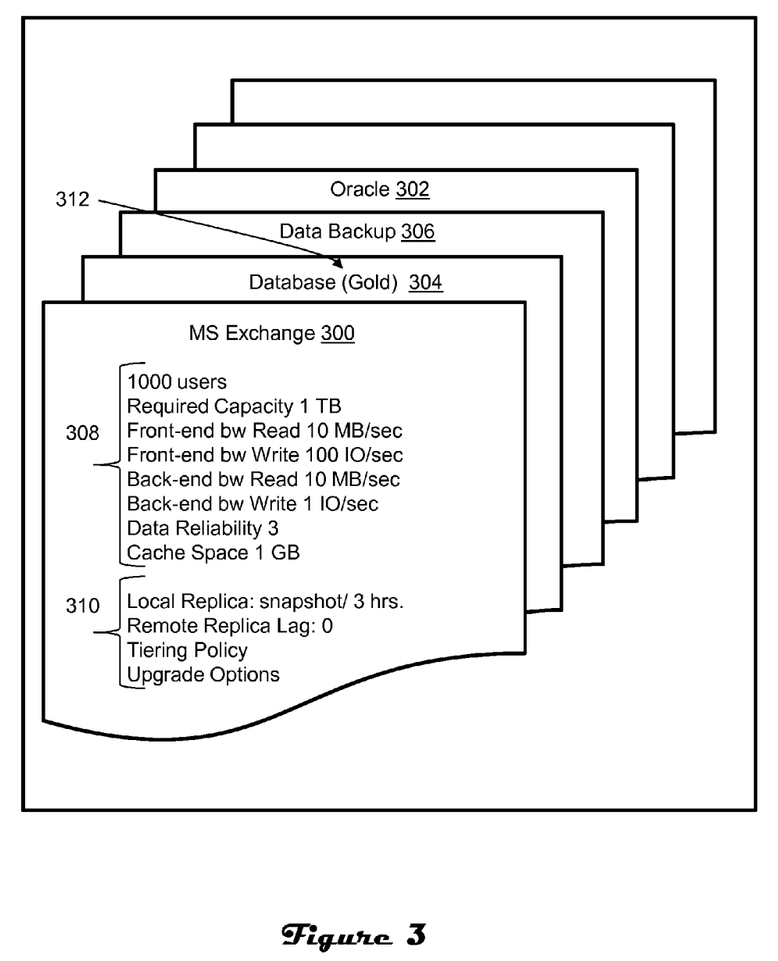

FIG. 3 illustrates storage descriptors which represent storage resource requirements for particular applications such as MS Exchange 300, Oracle 302, and types of applications such as databases 304 and data backup 306, although the requirements of other entities might be represented. Physical layer metrics 308 and logical layer metrics 310 are utilized to describe application requirements, or application type requirements. Further, because some storage requirements may scale as a function of certain conditions the storage descriptor may indicate base conditions for which the descriptor applies, e.g., 1000 users, and which metrics are scaled, and how the metrics are scaled, e.g., linearly. For example, MS Exchange might require 1 TB of capacity, 10 MB/sec Read, 100 IO/sec Write etc. to support 1000 users, but capacity to support 2000 users would double to 2 TB, whereas 10 MB/sec Read, 100 IO/sec Write would only grow by 50%. Consequently, it is possible to scale a storage descriptor and evaluate whether the storage node has available storage resources to support deployment of MS Exchange by comparing the scaled storage descriptor with the available storage node capabilities storage descriptor.

Storage-specific characteristics need not necessarily be included in the storage descriptors. For example, the type of disk (SATA, FC, Flash etc.) is not necessarily part of the storage descriptor, although attributes which vary depending on disk type such as performance, reliability, and MTBF may be described with metrics that are typically associated with application requirements. Similarly, the storage descriptors need not necessarily include the number of ports, but that information might be used to calculate the available front-end bandwidth (in MB/sec and IO/sec) for inclusion in the storage descriptor. Similarly, the storage descriptors need not necessarily include any QOS guarantees which tend to be application dependent, e.g., average response time depends on cache hit ratio, which in turn depends, among other factors, on the application IO profile. However, planning tools can be used to compute and predict the performance of common applications based on their workload and predicted cache hit ratio. With such characterization the storage QOS descriptors provided may include the specific application or type for which they are supported.

The storage descriptors can also or alternatively provide qualitative data storage availability or requirements data 312. For example, bronze level availability could indicate resources required for basic functionality of a specific application or type of application, and silver and gold levels could indicate resource levels associated with improved performance.

Figure 4:
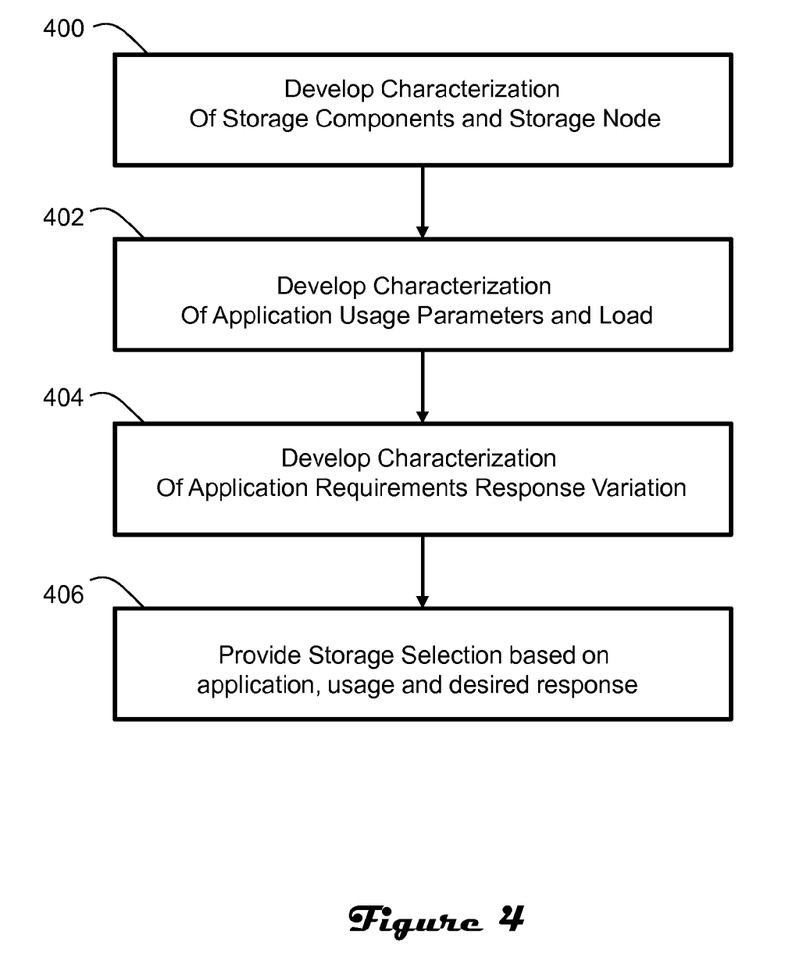
FIG. 4 illustrates steps associated with storage descriptor generation and use.

FIG. 4 illustrates an overview of storage descriptor creation and use. The illustrated steps need not necessarily be performed in the order in which they are illustrated, and certain aspects will be described in greater detail with reference to subsequent figures. Step 400 is to develop a characterization of storage components. Development of characterizations of storage components provides a characterization of the capabilities of the storage node. Step 402 is to develop a characterization of application usage parameters and load. Various types of applications may be deployed. In order to prepare for the possibility of such deployment storage descriptors for particular applications, types of applications, or both are developed. Step 404 is to develop a characterization of application requirements response variation. As previously mentioned, the storage requirements of an application may scale based on various factors, e.g., number of users. In order to allow scaling of descriptor metrics to approximate actual application requirements it is useful to characterize response variation. Step 406 is to provide a storage selection based on application, usage and desired response. This may include generating a suggested resource allocation for an administrator and automated or semi-automated provisioning.

Figure 5A:
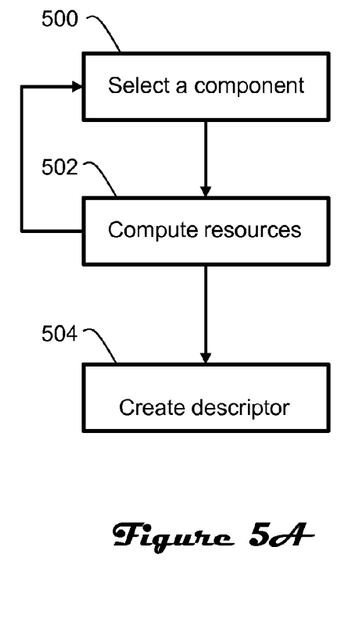
FIG. 5A illustrates generation of storage descriptors associated with storage capabilities.

FIG. 5A illustrates development of the characterizations of storage components and the storage node in greater detail. The storage node may include various components which effect capabilities. For example, different types of physical storage devices may be available, with various capacity for data storage and Read/Write speeds. Interfaces, ports and other factors also affect storage capabilities. The system iteratively selects components and computes associated resources in steps 500, 502. The resulting characterizations of individual components are then grouped to create a descriptor for the storage node in step 504, although storage capability descriptors at any level might be utilized, e.g., component, device, node, system etc.

Figure 5B:
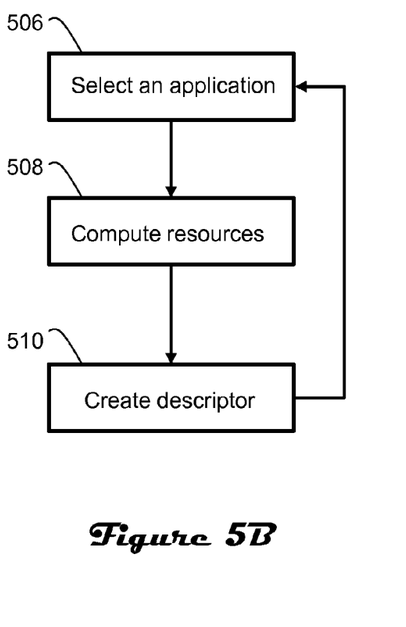
FIG. 5B illustrates generation of storage descriptors associated with storage requirements.

FIG. 5B illustrates development of the characterizations of application usage parameters and load in greater detail. The system iteratively selects an application, computes the resources required for that application and creates a storage descriptor for the application in steps 506, 508, 510. The result is a set of storage descriptors for particular applications, although storage descriptors may be generalized for other applications of a particular type, e.g., email, data backup etc. As previously described, the storage descriptors may be maintained in a catalog.

Figure 6:
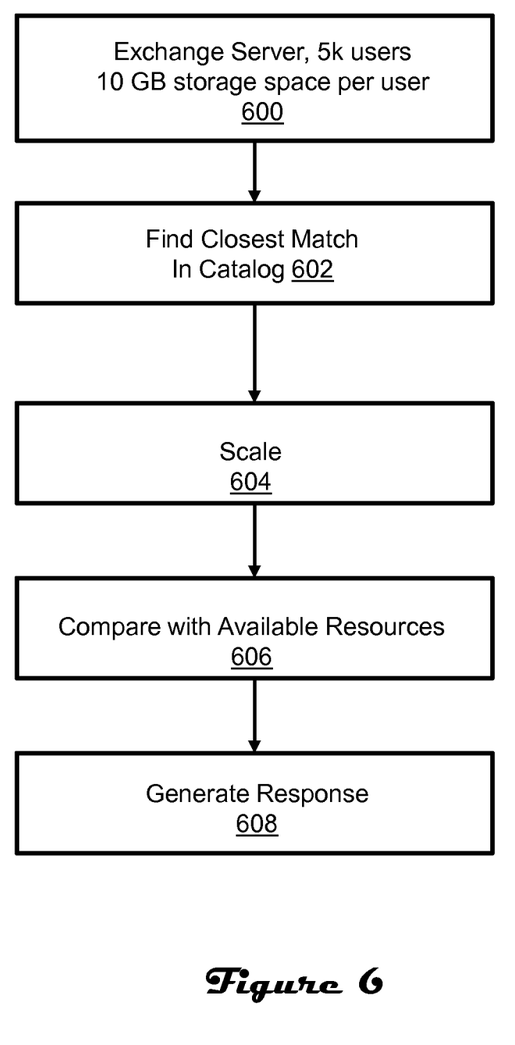
FIG. 6 illustrates storage descriptor use in greater detail.

FIG. 6 illustrates a specific example of storage descriptor use. In step 600 an administrator indicates the plan to deploy an exchange server with 5 k users. Although the system may be configured to evaluate the requirements of an exchange server with only the additional input of number of users, the administrator may also indicate other specific requirements such as 10 GB storage space per user. In step 602 the system locates the closest matching storage descriptor in the service catalog. For example, there may be a specific storage descriptor for an exchange server, or a generalized storage descriptor for email applications. In step 604 the requirements specified by the closest matching storage descriptor are scaled to match the input. In a simple example this may include scaling of some requirements. Other requirements may not require scaling. Because some storage requirements scale based on various factors such as number of users, the storage descriptor may include one or more scaling indicators. For example, the illustrated storage descriptor for MS Exchange includes an indication that the specified requirements will support 1000 users. This allows individual metrics to be scaled to indicate requirements for a specific scenario, e.g., 100 users or 10000 users. The storage descriptor may also include an indication of which metrics scale, with what variable they scale, and a function that defines how they scale (if non-linear). The result of the scaling step is compared with available resources in step 606. For example, a storage descriptor of available resources might be utilized, or a storage descriptor of total resources might be used as the basis for calculating available resources. A response is then generated in step 608. This can include, for example and without limitation, allocating the resources to the application, returning an indication to an admin of the required resources, returning an indication that the required resources are not available, returning an indication of qualitative options, etc.

The scaling step 604 and comparing step 606 involve descriptor arithmetic via which it is determined how to modify a descriptor to match an application, and what resources remain available once the specified resources are allocated. Using the example in which a storage descriptor indicate 1 TB of available storage with up to 100 MB/sec and 1000 IO/sec on the front end, up to 20 MB/sec and 100 IO/sec of back-end bandwidth, reliability of 5 nines, a snapshot every 8 hours with the 3 last snapshots available, and remote synchronous replica (0 lag), User A may require for an application a subset of the storage capabilities: 600 GB of storage with up to 40 MB/sec and 100 IO/sec of front-end IOs, up to 10 MB/sec and 40 IO/sec of back-end IOs, reliability of 5 nines, a snapshot every 8 hours for the last 24 hours, and remote synchronous replica (0 lag). Assuming no scaling is required, program logic computes that the remaining capabilities are: 400 GB of storage (1 TB minus 600 GB) with up to 60 MB/sec and 900 IO/sec of front-end IOs, up to 10 MB/sec and 60 IO/sec of back-end IOs, reliability of 5 nines, a snapshot every 8 hours for the last 24 hours, and remote synchronous replica (0 lag). This information may be used to update the available storage node capabilities descriptor 202 (FIG. 2). User B may then require another subset of the capabilities: 400 GB of storage with up to 40 MB/sec and 100 IO/sec of front-end IOs, up to 5 MB/sec and 40 IO/sec of back-end IOs, reliability of 99.99% (4 nines) and no replicas. The program logic computes the remaining capabilities as follows: 0 GB of storage with up to 20 MB/sec and 800 IO/sec of front-end IOs, up to 5 MB/sec and 20 IO/sec of back-end IOs, reliability of 5 nines, a snapshot every 8 hours for the last 24 hours, and remote synchronous replica (0 lag). This information is used to again update the available storage node capabilities descriptor 202 (FIG. 2). Note that although this descriptor does not allow allocating more storage, it still has storage resources available to allocate for applications that already have storage but need more IO power. Note also that, as with scaling, the computations may differ depending on the resources being allocated. For example, capacity and bandwidth are scaled and added, whereas reliability and replicas need not be scaled and can be shared with no cost.

Referring again to FIG. 2, another aspect which may be utilized is a Storage Management Interface (SMI) descriptor 208. An SMI descriptor includes a set of assumptions about resource consumption and usage patterns over time. The assumptions correspond to a storage consuming entity type, for example and without limitation an application or a business service, in a particular data center. It may also include guidance to the system about what to do if one or more of the assumptions are invalidated. The customer would either choose from a library of SMIs or generate an SMI when installing a new system, using the methods described above. When generating a new SMI, a customer could optionally specify the application type. The SMIs would include elasticity coefficients to account for growth and reduction of the workload and data set. For example, if the workload grows in storage capacity at a rate of 20% per annum, the customer could select an SMI that would provide sufficient capacity for some duration.

Figure 7:
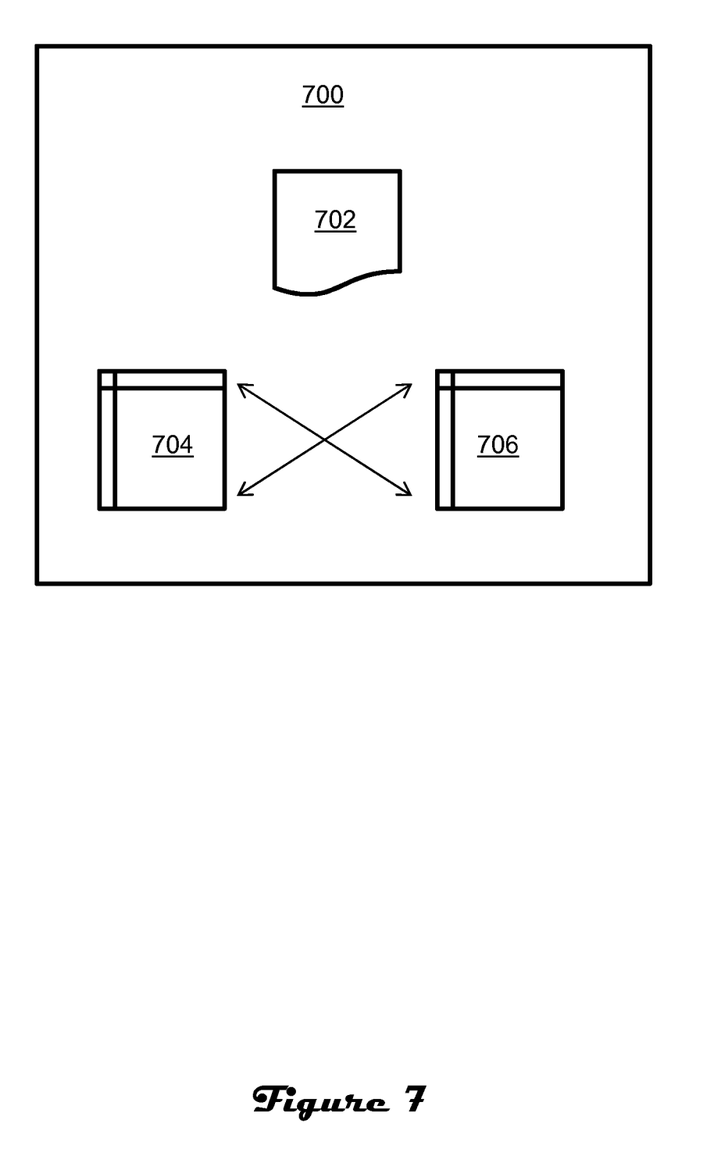
FIG. 7 illustrates a storage service catalog.

Referring to FIG. 7, another aspect which may be utilized is a storage service catalog 700. A storage service catalog includes a list 702 of storage services that are offered by the storage system in a data center. One difference between an entry in a storage service catalog and a storage descriptor is the type of language used to characterize the service. The service catalog presents application requirements and storage capabilities as a service, using terms which can be readily understood by end users. Another difference between an entry in a storage service catalog and a storage descriptor is that a storage descriptor refers to a single type of storage while a storage service catalog entry may refer to multiple different types of storage needed for deployment of a single application. The service catalog also maps application-centric requirements 704 to a set of storage descriptors and SMIs 706 that will be used to implement the service. For example, an Exchange 2010 application may have a catalog entry where the parameters are the number of users, data protection level (High, Medium, Low) and desired performance level (H/M/L). A catalog entry may also include life-cycle information such as events that increase the performance requirements, e.g., end of quarter. Catalogs can be supplemented by application vendors, system integrators and users. Storage arrays translate these catalog entries into storage terms, such as data protection (RAID level), local replication parameters (snapshots, clones, continuous data protection), remote replication parameters (RPO, RTO), performance (bandwidth, maximal IO/sec rate, response time), etc. Consequently, a Virtual Machine administrator running, e.g. and without limitation VMware management consoles, can provision new applications together with their storage, with guarantees on the storage SLA, without a need for a storage administrator.

The storage templates may be combined with server, networking and application level templates to form integrated higher level templates.

While the invention is described through the above exemplary embodiments, it will be understood by those of ordinary skill in the art that modification to and variation of the illustrated embodiments may be made without departing from the inventive concepts herein disclosed. Moreover, while the embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
   receiving information regarding application requirements of an application in a network;
   searching among a plurality of storage descriptors to identify a storage descriptor which is a closest match to the received information, the identified storage descriptor indicating storage resource requirements corresponding to the application requirements;
   comparing the storage resource requirements with available storage resources; and
   prompting a response based on comparison of the storage resource requirements with available storage resources.

2. The method of claim 1 including identifying a closest match storage descriptor for a particular application.

3. The method of claim 1 including identifying a closest match storage descriptor for a type of application.

4. The method of claim 1 including scaling at least some of the requirements specified by the identified storage descriptor based on the information received regarding deployment of the application.

5. The method of claim 1 wherein comparing the storage resource requirements with available storage resources includes comparing physical layer metrics comprising one or more of: storage capacity; front-end bandwidth; IOPS; back-end bandwidth; data availability; and cache space.

6. The method of claim 1 wherein comparing the storage resource requirements with available storage resources includes comparing logical layer metrics comprising one or more policies including: local replica policy; remote replica lag; automated storage tiering policy; and upgrade options.

7. The method of claim 1 including providing qualitative data storage metrics in the information regarding deployment of the application.

8. The method of claim 1 including providing qualitative data storage metrics as part of the response.

9. The method of claim 1 including utilizing a storage management interface descriptor with projections regarding resource consumption or usage patterns over time to generate the response.

10. The method of claim 1 including utilizing a storage service catalog to generate the response.

11. A computer program stored on non-transitory computer-readable memory comprising:
    logic which receives, at a storage node, information regarding application requirements of an application in a network;
    logic which searches among a plurality of storage descriptors to identify a storage descriptor which is a closest match to the received information, the identified storage descriptor indicating storage resource requirements corresponding to the application requirements;
    logic which compares the storage resource requirements with available storage resources; and
    logic which prompts a response based on comparison of the storage resource requirements with available storage resources.

12. The computer program of claim 11 including logic which identifies a closest match storage descriptor for a particular application.

13. The computer program of claim 11 including logic which identifies a closest match storage descriptor for a type of application.

14. The computer program of claim 11 including logic which scales at least some of the requirements specified by the identified storage descriptor based on the information received regarding deployment of the application.

15. The computer program of claim 11 wherein the logic which compares the storage resource requirements with available storage resources compares physical layer metrics comprising one or more of: storage capacity; front-end bandwidth; IOPS; back-end bandwidth; data availability; and cache space.

16. The computer program of claim 11 wherein the logic which compares the storage resource requirements with available storage resources compares logical layer metrics comprising one or more policies including: local replica policy; remote replica lag; automated storage tiering policy; and upgrade options.

17. The computer program of claim 11 including logic which provides qualitative data storage metrics in the information regarding deployment of the application.

18. The computer program of claim 11 including logic which provides qualitative data storage metrics as part of the response.

19. The computer program of claim 11 including logic which utilizes a storage management interface descriptor with projections regarding resource consumption or usage patterns over time to generate the response.

20. The computer program of claim 11 including logic which utilizes a storage service catalog to generate the response.

21. Apparatus comprising:
a storage node including storage resources and control logic which:
  receives information regarding application requirements of an application in a network;
  searches among a plurality of storage descriptors to identify a storage descriptor which is a closest match to the received information, the identified storage descriptor indicating storage resource requirements corresponding to the application requirements;
  compares the storage resource requirements with available storage resources; and
  prompts a response based on comparison of the storage resource requirements with available storage resources.

22. The apparatus of claim 21 wherein the control logic identifies a closest match storage descriptor for a particular application.

23. The apparatus of claim 21 wherein the control logic identifies a closest match storage descriptor for a type of application.

24. The apparatus of claim 21 wherein the control logic scales at least some of the requirements specified by the identified storage descriptor based on the information received regarding deployment of the application.

25. The apparatus of claim 21 wherein the control logic compares the storage resource requirements with available storage resources includes comparing physical layer metrics comprising one or more of: storage capacity; front-end bandwidth; back-end bandwidth; data availability; and cache space.

26. The apparatus of claim 21 wherein the control logic compares the storage resource requirements with available storage resources includes comparing logical layer metrics comprising one or more policies including: local replica policy; remote replica lag; automated storage tiering policy; and upgrade options.

27. The apparatus of claim 21 wherein the control logic receives qualitative data storage metrics in the information regarding deployment of the application.

28. The apparatus of claim 21 wherein the control logic provides qualitative data storage metrics as part of the response.

29. The apparatus of claim 21 wherein the control logic utilizes a storage management interface descriptor with projections regarding resource consumption or usage patterns over time to generate the response.

30. The apparatus of claim 21 wherein the control logic utilizes a storage service catalog to generate the response.

* * * * *